No. 648,435. Patented May 1, 1900.
C. B. RIDER.
SECTIONAL GLASS CUP.
(Application filed Oct. 26, 1899.)
(No Model.)
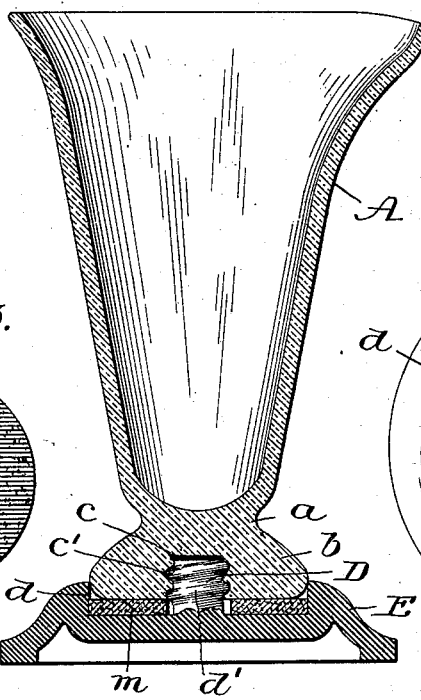
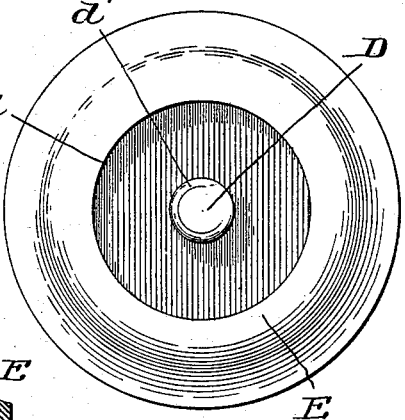
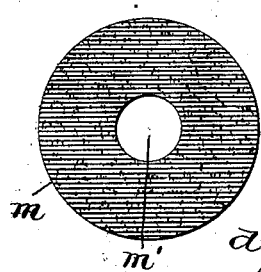
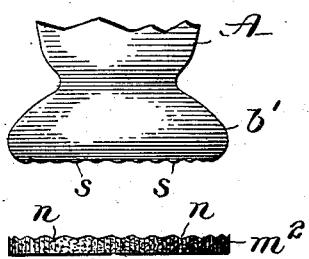
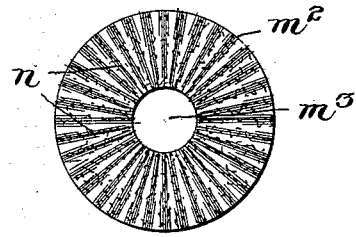
Witnesses.
Inventor.
Charles B. Rider
Attorney.

UNITED STATES PATENT OFFICE.

CHARLES B. RIDER, OF PHILADELPHIA, PENNSYLVANIA.

SECTIONAL GLASS CUP.

SPECIFICATION forming part of Letters Patent No. 648,435, dated May 1, 1900.

Application filed October 26, 1899. Serial No. 734,814. (No model.)

*To all whom it may concern:*

Be it known that I, CHARLES B. RIDER, a citizen of the United States, residing at Philadelphia, Pennsylvania, have invented certain new and useful Improvements in Sectional Glass Cups, of which the following is a full, clear, and exact description, reference being had to the accompanying drawings, forming a part of this specification.
My invention relates to sectional glass cups and to the means for uniting the parts thereof, and is particularly adapted to the specific character of glass known as a "graduate-glass" for druggists' use.
It has for its principal object to make the device less breakable at or near its base portion; and it consists, primarily, in a glass provided with a base extension below the cup portion of such depth as to adapt it to have molded or otherwise formed therein a central longitudinal screw-threaded recess; also, in the combination therewith of a detachable base-piece, of non-fragile material, of suitable exterior shape and provided with an annular recess adapted to receive the base extension of the glass, said recess containing a central screw-threaded projection adapted to register with the screw-threaded recess in the glass; also, in the combination therewith of an elastic cushion adapted to fit into said recess in the detachable base and surround the projection therein.

My improvement also comprises a modified form of construction of the base of the cup and of the elastic cushion.

In the drawings illustrating my invention, Figure 1 is a vertical section of a sectional glass cup in the form of a graduate-glass, illustrating the several features of my invention. Fig. 2 is a plan view of the non-fragile base; Fig. 3, a plan view of the elastic cushion. Figs. 4, 5, and 6 are designed to illustrate the modified form of glass base and cushion, Fig. 4 being an elevation of said glass base, Fig. 5 a like view of the elastic cushion, and Fig. 6 a plan view of the latter.

In said drawings, A represents the cup portion of a graduate-glass, a neck *a* thereon being non-essential, and *b* the base portion, the diameter of which may be greater or less, as desired, to adapt it to be centrally recessed, such diameter or thickness depending, obviously, on the size of the cup. The said base extension *b* is molded or otherwise formed with a central recess *c*, provided with screw-threads *c'*. The supporting-base (indicated at E) is of non-fragile material—such as wood, hard rubber, or aluminium—and is of any suitable shape, preferably annular, as shown in Fig. 2, and is centrally recessed at *d* (see Figs. 1 and 2) to adapt it to receive the base of the glass cup, and said recess is provided with a central vertically-projecting stem D, with screw-threads *d'* cut therein. Within the recess *d* in the supporting-base E is fitted a flat cushion *m*, of some elastic substance, preferably rubber or cork, adapted to fit into said recess *d* and separate the base of the glass from the supporting-base E and having a central opening *m'* to encircle the projecting stem D of the supporting-base.

It is obvious that the projecting stem D, with its screw-threads *d'*, of the supporting-base E must be adapted in size and character to register with the central recess *d* and with its screw-threads *c'* of the base portion of the glass.

The extension-base *b* of the glass cup is shown in Fig. 1 as having a diameter sufficient to support the glass vertically as a base-rest when detached from the non-fragile base E, and this is desirable for many obvious reasons, but is not essential in the combination with the latter and with the cushion.
In the modification shown in Figs. 5 and 6 the elastic cushion therein (marked $m^2$) is provided with a like central opening $m^3$, but with radial corrugations *n*, as shown in said figures, and the under face of the base portion *b'* of the glass is provided with like radial corrugations *s s*, proceeding in the same manner from the periphery to central opening, the object or function of said corrugations being to prevent rotation of the parts too easily and to afford a tighter joint, especially when a rubber cushion is employed.

I am aware that it is not broadly new to make a sectional glass cup with detachable and non-fragile base, either in the ordinary forms of glass cups or specifically in that of graduate-glass, and that various patents have been heretofore issued for the particular means of uniting the glass portion and the non-fragile base portion of such structures.

My improvement hereinabove described is, apart from the modified character of the glass portion, limited to the novel means of uniting said portions, my described means involving features which distinguish it from its predecessors in the art, while possessing decided advantages which they do not, principally in the following particulars: It is less liable to break because the projecting member of the uniting means is part of the non-fragile base. It is less liable to break from a hard and hasty placing of it on a table, because the elastic cushion will absorb most of the shock, and the somewhat-thickened extension-base of the glass below the cup portion lends its own strength in this construction, as well as adapting it, when made of sufficient diameter, to support the glass upright thereon, and hence to make a graduate of the usual form to which druggists are accustomed.

Having thus described my invention, I claim as new and desire to secure by Letters Patent—

1. A sectional glass cup, having an extension-base portion $b$ of suitable diameter adapted to support the glass, with a central longitudinal screw-threaded recess $c$ therein, a supporting-base E of non-fragile material, centrally recessed at $d$ and having a vertically-projecting screw-threaded stem D; and an annular cushion $m$ of elastic material, arranged within the recess $d$ of the supporting-base and adapted to be interposed between the same and the base portion of the glass; substantially as described.

2. A sectional glass cup having an extension-base portion $b'$ of enlarged diameter, provided with radial corrugations $s, s$, and with a centrally-screw-threaded recess $c$, a supporting-base E of non-fragile material, centrally recessed at $d$ and having a vertically-projecting screw-threaded stem D; and an annular cushion $m^2$ of elastic material, having radial corrugations $n$ on its surface, arranged within the recess $d$ of the supporting-base and adapted to be interposed between the same and the base portion of the glass; substantially as described.

In testimony whereof I have hereunto affixed my signature this 29th day of September, A. D. 1899.

CHARLES B. RIDER.

Witnesses:
 H. T. FENTON,
 C. E. PARKER.